United States Patent

[11] 3,599,304

| [72] | Inventor | Kenneth Senior<br>Frinton on sea, England |
|---|---|---|
| [21] | Appl. No. | 687,213 |
| [22] | Filed | Dec. 1, 1967 |
| [45] | Patented | Aug. 17, 1971 |
| [73] | Assignee | W. Green Son & Waite Limited<br>Kent, England |
| [32] | Priority | Dec. 5, 1966 |
| [33] | | Great Britain |
| [31] | | 54,390/66 |

[54] DANDY AND WATERMARK ROLLS
7 Claims, 5 Drawing Figs.

[52] U.S. Cl. .................................................. 29/121 R
[51] Int. Cl. ...................................................... B21b 27/02
[50] Field of Search........................................... 162/357,
314; 29/116—121

[56] References Cited
UNITED STATES PATENTS 3,445,332  5/1969  Johnston .................. 162/357
3,487,517  1/1970  Douglas .................... 29/121

FOREIGN PATENTS 913,681  12/1962  Great Britain .............. 162/314

Primary Examiner—Reuben Friedman
Assistant Examiner—T. A. Granger
Attorney—Jones and Lockwood ABSTRACT: The specification deals with the construction of the supporting rings in the frame structures of dandy rolls and watermark rolls and discloses how such rings can be built up from elongate material formed to shape in place of conventional stamped plate members. In a preferred arrangement, two lengths of wire are formed into inner and outer circles which are connected concentrically by intermediate members, which may again be of wire, and which comprise locations for the attachment of longitudinally extending support members, such as spirally wound wires, of the roll frame structure.

DANDY AND WATERMARK ROLLS

This invention relates to dandy rolls and watermark rolls such as are used in the production of paper.

The construction of such rolls typically comprises a series of supporting or spacing discs or rings at intervals along the length of the roll. Over the outer periphery of these rings are attached a series of axially directed stringers, while nearer the central axis of the roll the rings are secured to longitudinally extending support or bracing members that are usually of slow spiral form. The outer stringers may carry a close spiral wire on which is supported an outer gauze surface of the roll or, for laid or verge papers, these stringers carry a series of outer circular plate rings which have holes punched adjacent their outer peripheries to secure a series of axially directed wires.

The supporting rings may be stamped or cut from sheet metal but this method has the disadvantage that it involves heavy waste. In the manufacture of large rings, a high percentage of the sheet material may be lost because the central disc which remains can only be used for the manufacture of rings of smaller diameter and the likelihood of this happening is so remote that in general it only has scrap value. Since for a number of reasons, such as the requirements it has to meet for strength and resistance to corrosion, the material used is expensive such waste adds greatly to the cost of the finished product.

According to the present invention there is provided a supporting ring for a dandy roll or watermark roll wherein said ring comprises a length of elongate material formed to a circular shape and having its ends joined together, the ring having, inwardly of its outer periphery, locations for the attachment of longitudinally extending support members of the roll.

The material used for the ring may be wire, of circular cross section for example, and the ring may then be formed of inner and outer wire circles joined in concentric relation by intermediate members.

When the ring is thus fabricated from wire the intermediate members for holding the two toroids in spaced relation may also be of wire or of sheet or strip and the joints may be effected by argon arc welding. These intermediate members may be employed to provide said longitudinal support member locations so that the members can be placed at any radial distance between the inner and outer diameters of the ring. If the intermediate members are of sheet or strip this may be pierced for the passage of the longitudinal members and the use of such sheet material of relatively narrow width facilitates welding of the intermediate members both at their engagement with the inner and outer wire circles and with the longitudinal members. Alternatively, however, the apertures receiving the longitudinal members may be deformed to clamp the members. If the intermediate members are of wire they may be bent to form apertures for the passage of the longitudinal members, these apertures then providing convenient location and anchoring surfaces.

The invention will be more particularly described with reference to the accompanying drawings, wherein.

Figure 1:
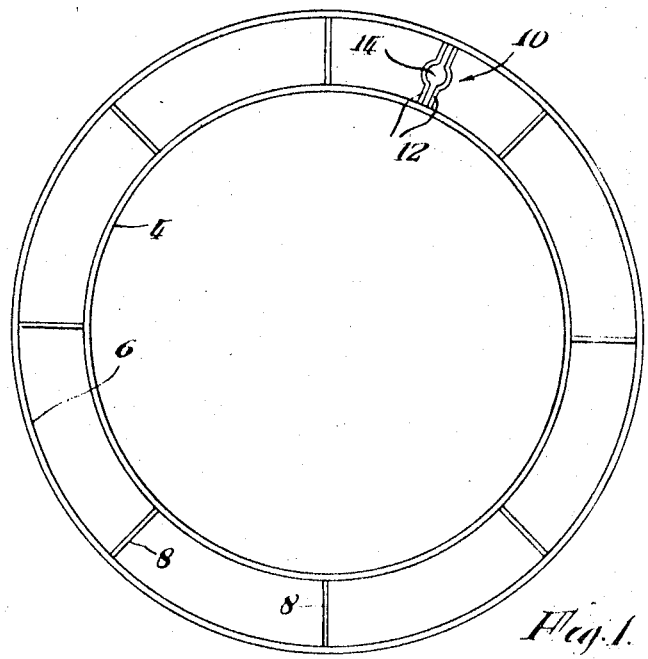
FIG. 1 shows one form of supporting ring according to the invention.

Referring to FIG. 1, the supporting ring is constructed from stainless steel wire and comprises concentric inner and outer circular members 4, 6 respectively which are each formed from straight lengths of circular section wire their ends being butt jointed together. The rings are joined by members also of circular section wire in the form of spokes 8 which are secured in position by argon arc welding. Also positioned between and secured to the rings 4 and 6 are further intermediate members in the form of brackets 10, only one of which is shown, made from two pieces of wire 12 each bent so as to form between them an aperture 14 which is adapted to receive respective longitudinal helical bracing members (not shown) of the dandy roll. The bracing members are secured to the members 10 so as to prevent relative movement between the supporting ring and the bracing members.

Figure 4:
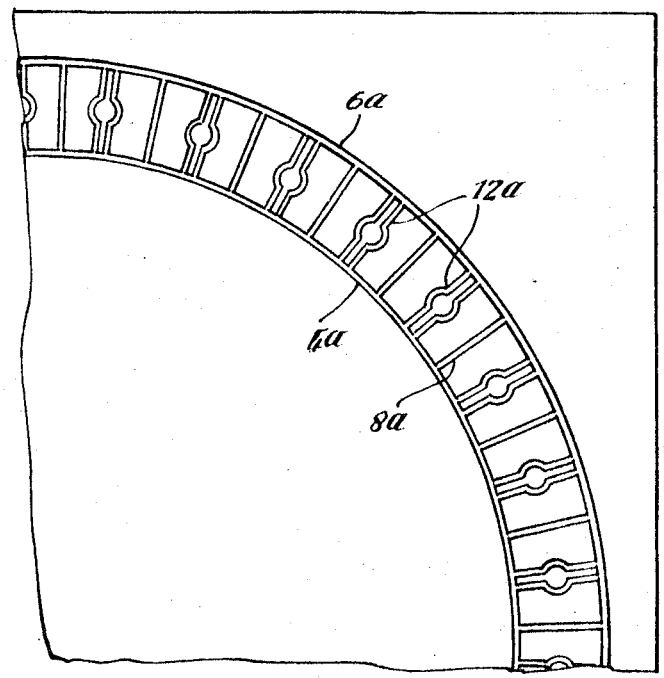
FIG. 4 is a front view of a part of a plate former for use in the construction of the ring in FIG. 1.

In the manufacture of the ring to the required degree of concentricity, a plate former may be used in a surface of which grooves are cut, or recesses are otherwise formed, defining a pattern for the ring. Such a plate former is illustrated in FIG. 4 where grooves 4a, 6a are formed to accommodate the inner and outer wire rings 4, 6 respectively, pairs of grooves 12a receive the opposed wires of each bracket 10 and further grooves 8a receive the spokes 8. The wire is severed to the correct lengths for the various parts of the ring, the circular portions are preformed to their required contours and the lengths are welded together by an argon arc process after being inserted in their grooves in the former.

The circular section wire construction described has particular advantages in operation in that it offers a relatively clean structure, that is to say, it will collect less of the fines and other solids in the drainage water than a conventional construction. The rounded section of the ring also reduces the amount of water thrown back out of the roll. Also, since the rings, the outer stringers and the inner longitudinally extending support members can be arranged to have similar cross-sectional sizes, the joints between them can be welded instead of using solder as in conventional constructions which introduces corrosion problems in use. It is, however, possible to use other known joining techniques to secure together the parts of the ring.

Figure 2:
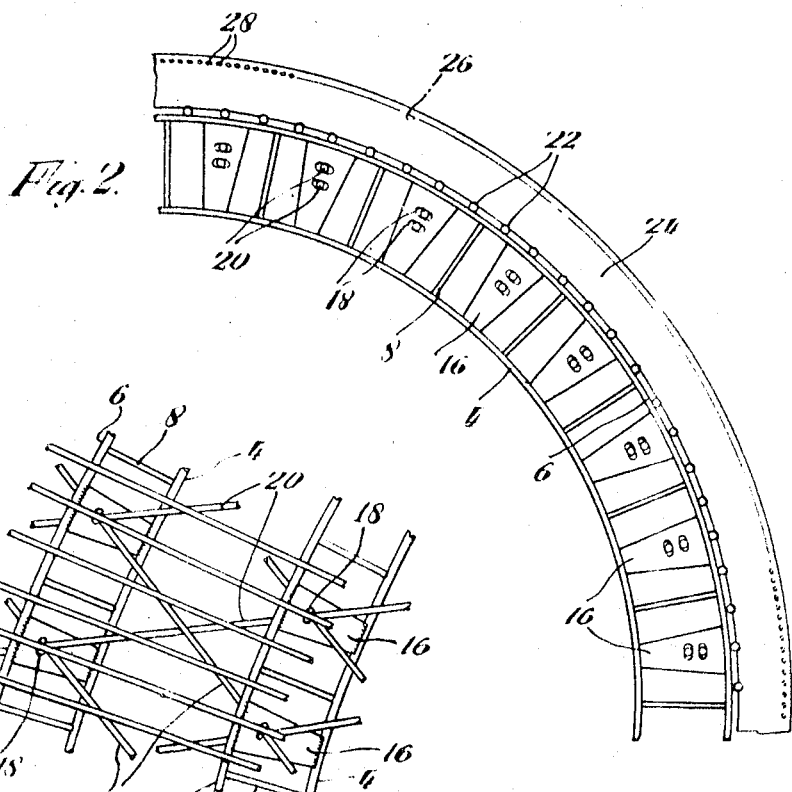
FIG. 2 is an enlarged part view showing a modification of the ring in FIG. 1.
Figure 3:
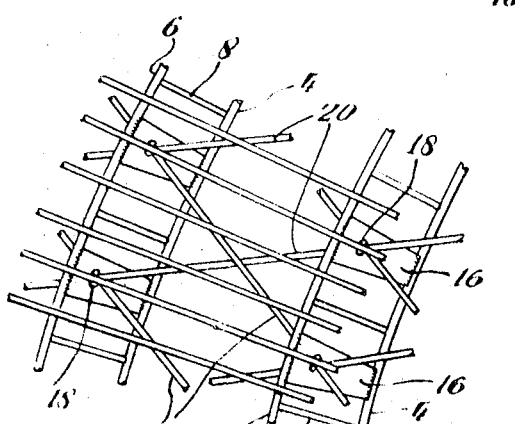
FIG. 3 is a part perspective view of a construction utilizing supporting rings as shown in FIG. 2.

FIGS. 2 and 3 show a modified form of supporting rings in which intermediate members receiving the longitudinal helical bracing members are in the form of sheet metal plates 16 secured between the inner and outer wires 4, 6 in alternation with circular wire spokes 8. Each plate is provided with two slots 18, each one of which is adapted to receive a longitudinal helical bracing member 20 of the dandy roll. Similarly to the construction described above, the bracing members 20 may be secured to the plates 16 by a welding operation but alternatively or additionally to this, the material displaced in the formation of the slots 18 may be folded back so that it can be deformed again when the members 20 are inserted in the slots and thereby grip the members firmly.

FIGS. 2 and 3 also illustrate axially directed stringers 22 secured to the outer periphery of the supporting ring and FIG. 2 shows how a laid or verge roll using this inner supporting structure is provided at the station of each supporting ring with an outer ring plate 24 cut from sheet metal. The inner periphery of the plate is notched to fit upon the stringers 22 and a series of holes are punched in the plate adjacent its outer periphery on a pitch circle 26 to receive laid wires 28.

It will be appreciated that in such a construction material wastage may be unavoidable in cutting the outer ring plates but the other advantages referred to above of the novel construction are still obtainable. Also, in this application of the invention to laid rolls it is possible to use a standard diameter inner supporting structure for different diameter rolls, with a consequent simplification of manufacturing procedures, the outer ring plates then being cut to the required outer diameter before attachment to the supporting structure.

Figure 5:
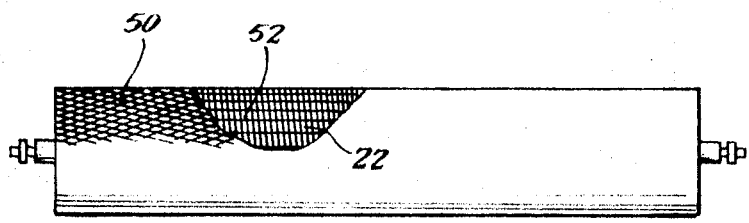
FIG. 5 shows a completed dandy roll.

The alternative form of roll shown in FIG. 5 has an outermost layer of wire gauze 50 that is supported on a close-wound spiral wire 52 that bears in turn on the axial stringers 22 in place of the outer ring plates 24 of a laid or verge roll.

What I claim and desire to secure by Letter Patent is:

1. A supporting ring structure for a dandy roll or a watermark roll comprising two closed circles of wire disposed concentrically to each other, intermediate members extending between and secured to the wire circles to interconnect said circles, location elements being provided within the area of the outer wire circle for the attachment to the supporting ring structure of support members extending longitudinally of the roll.

2. Apparatus according to claim 1 wherein said location elements are formed on at least some of said intermediate members.

3. Apparatus according to claim 2 wherein the intermediate members provide said location elements and each comprise a pair of lengths of wire disposed adjacent each other to form a longitudinal member location aperture between them.

4. Apparatus according to claim 3 wherein said intermediate member wires each comprise a convexly formed intermediate portion and two terminal portions extruding from respective ends of said intermediate portion, the further ends of the terminal portions being secured to the inner and outer wire circles, the convex portions of the two intermediate member wires being disposed in conjunction with each other to form the location aperture.

5. Apparatus according to claim 2 wherein the intermediate members providing said location elements are each of sheet or plate form and apertures in said members define the location elements.

6. Apparatus according to claim 1 wherein the circles of are of rounded section.

7. Apparatus according to claim 1 wherein the circles of wire and the intermediate members are of similar thicknesses and are secured to each other by a welding.

UNITED STATES PATENT OFFICE
CERTIFICATE OF CORRECTION

Patent No. 3,599,304　　　　　　　　　Dated August 17, 1971

Inventor(s) Kenneth Senior

It is certified that error appears in the above-identified patent and that said Letters Patent are hereby corrected as shown below:

Column 4, line 8, after "circles of" insert --wire--.

Signed and sealed this 21st day of March 1972.

(SEAL)
Attest:

EDWARD M. FLETCHER, JR.　　　　　　　　ROBERT GOTTSCHALK
Attesting Officer　　　　　　　　　　　Commissioner of Patents